US009392210B2

(12) United States Patent
Berbecel et al.

(10) Patent No.: US 9,392,210 B2
(45) Date of Patent: Jul. 12, 2016

(54) TRANSCODING A VIDEO STREAM TO FACILITATE ACCURATE DISPLAY (75) Inventors: Gheorghe Berbecel, Irvine, CA (US); Wade Wan, Orange, CA (US)

(73) Assignee: BROADCOM CORPORATION, Irvine, CA (US)

( * ) Notice: Subject to any disclaimer, the term of this patent is extended or adjusted under 35 U.S.C. 154(b) by 114 days.

(21) Appl. No.: 13/426,814

(22) Filed: Mar. 22, 2012

(65) Prior Publication Data
US 2013/0251333 A1    Sep. 26, 2013

(51) Int. Cl.
*H04N 5/775* (2006.01)
*H04N 5/783* (2006.01)
*H04N 21/432* (2011.01)
*H04N 21/4402* (2011.01)

(52) U.S. Cl.
CPC ............ *H04N 5/783* (2013.01); *H04N 21/4325* (2013.01); *H04N 21/440245* (2013.01)

(58) Field of Classification Search
None
See application file for complete search history.

(56) References Cited

U.S. PATENT DOCUMENTS

| 2002/0009137 | A1* | 1/2002 | Nelson | H04N 7/01 375/240.1 |
| 2002/0126754 | A1* | 9/2002 | Shen et al. | 375/240.12 |
| 2002/0168175 | A1* | 11/2002 | Green et al. | 386/68 |
| 2003/0163824 | A1* | 8/2003 | Gordon et al. | 725/90 |
| 2004/0076236 | A1* | 4/2004 | Duruoz | H04N 7/01 375/240.25 |
| 2005/0012860 | A1* | 1/2005 | Cooper | 348/515 |
| 2006/0034369 | A1* | 2/2006 | Mohsenian | 375/240.03 |
| 2006/0085521 | A1* | 4/2006 | Sztybel | H04L 67/22 709/219 |
| 2006/0153289 | A1* | 7/2006 | Choi | H04N 19/597 375/240.01 |
| 2006/0204033 | A1* | 9/2006 | Yoshimine | G09B 21/009 382/103 |
| 2007/0014531 | A1* | 1/2007 | Mughal et al. | 386/68 |
| 2007/0154185 | A1  | 7/2007 | Wan et al. | |
| 2010/0121971 | A1* | 5/2010 | Shao et al. | 709/231 |
| 2010/0150523 | A1* | 6/2010 | Okubo et al. | 386/68 |
| 2012/0155839 | A1* | 6/2012 | Lee | 386/355 |

FOREIGN PATENT DOCUMENTS

| GB | 2447736 | 9/2008 |
| WO | 2011100727 | 8/2011 |

OTHER PUBLICATIONS

European Search Report mailed Jul. 19, 2013 for 12008550.1-1902.
Office Action for Taiwanese Patent Application No. 101146373, dated Jun. 2, 2015, 7 pages.
Office Action for Chinese Patent Application No. 201210593444.1, dated Nov. 19, 2015, 9 pages.

* cited by examiner

*Primary Examiner* — Hung Dang
*Assistant Examiner* — Sunghyoun Park
(74) *Attorney, Agent, or Firm* — Foley & Lardner LLP (57) ABSTRACT

Disclosed are various embodiments for transcoding a video stream to facilitate accurate display. An uncompressed video stream comprising a sequence of video frames is obtained. An encoded reverse order video stream is generated from the uncompressed video stream in one embodiment. In another embodiment, the uncompressed video stream includes multiple views, and a compressed video stream is generated from the uncompressed video stream. The compressed video stream excludes one or more of the views.

16 Claims, 9 Drawing Sheets

TRANSCODING A VIDEO STREAM TO FACILITATE ACCURATE DISPLAY

BACKGROUND

Digital video recording (DVR) applications are becoming more prevalent in today's marketplace. These applications typically involve recording digital terrestrial, cable or satellite bit streams to a local or network storage device, such as a hard disk drive. The local availability of the bit stream during playback allows users to pause, fast forward, and rewind content similar to the operation of a video cassette recorder (VCR). These special modes of video operation are often referred to as trick modes or trick-play modes. A common difficulty with implementing trick modes is the decoding dependency between pictures in a digital video bit stream.

A digital video bit stream may be partitioned into successive groups of pictures (GOPs), where each picture or frame in the GOP may be of a pre-defined picture coding type. In this regard, a video standard that is generally considered is the MPEG-2 standard, defined in ISO/IEC JTC1/SC29, "Generic coding of moving pictures and associated audio", ISO/IEC 13818-2, Draft International Standard, November 1994. In MPEG-2 applications, the picture coding types may comprise intra-coded pictures, predicted pictures, and bidirectional-predicted pictures. The intra-coded, or I-pictures, may only use the information within the picture to perform video compression or encoding. These self-contained I-pictures provide a base value or anchor that is an estimate of the value of succeeding pictures. Each GOP may generally start with a self-contained I-picture as the reference or anchor frame from which the other frames in the group may be generated for display. A GOP may start with an I-picture when describing the transmission, decoding, and/or processing order of a picture sequence, for example.

The GOP frequency, and correspondingly the frequency or periodicity of I-pictures, may be driven by specific application spaces. The predicted, or P-pictures, may use a motion estimation scheme that generates motion vectors that may be utilized to predict picture elements from previously encoded pictures. Compressing or encoding the difference between predicted samples and the source value results in better coding efficiency than that which may be achieved by transmitting the encoded version of the source picture information. At a receiver or decoder side, the compressed or encoded difference picture is decoded and subsequently added to a predicted picture for display.

The bidirectional-predicted pictures, or B-pictures, may use multiple pictures that occur in a future location in the GOP and/or in a past location in the GOP to predict the image samples. As with P-pictures, motion estimation may be used for pixel prediction in B-pictures and the difference between the original source and the predicted pictures may be compressed. At the receiver, or decoder, end, one or more B-pictures may be motion compensated and may be added to the decoded version of the compressed difference signal for display. Since both the P-pictures and B-pictures may be based on other pictures, they may be referred to as inter-coded pictures.

Another video standard is the advanced video coding (AVC) standard, JVT Editors (T. Wiegand, G. Sullivan, A. Luthra), "Draft ITU-T Recommendation and final draft international standard of joint video specification", ITU-T Rec.H.264 | ISO/IEC 14496-10 AVC, JVT-G050r1, Geneva, May 2003, which is also known as JVT, H.264, or MPEG-4 Part 10. In the AVC standard, instead of B-picture, P-picture, and I-picture types, the type definitions are made slice-wise, where a slice may cover an entire picture. However, it is commonly accepted practice to refer to I-pictures as pictures which only contain intra-coded or I-slices, P-pictures as pictures which may contain predicted slices (P-slices) or I-slices, and B-pictures as pictures which may contain bi-directional or bi-predictive slices (B-slices), P-slices, or I-slices. In the AVC standard, the B-pictures may also be used for prediction, further complicating the decoding dependency between pictures in a bit stream.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the modern era of digital video, trick modes are becoming important so that users can easily browse content both forward and backward and at various speeds to find scenes of interest. If the input video stream is presented in a compressed form, then faster trick play is typically implemented by jumping in the compressed stream to a frame that is an entry point (e.g., an I-frame), which does not depend on information prior in time to that frame. Reverse trick play is much more difficult than forward trick play because the input video stream is compressed for display in the forward direction.

Various embodiments of the present disclosure enable transcoding of a video stream to facilitate reverse trick play. To this end, a video stream is obtained in an uncompressed form, and a portion of the video stream is stored in a buffer. The portion of the video stream is encoded in a reverse order to facilitate reverse trick play. The encoded reverse order video stream may be stored. The encoded reverse order video stream may then be decoded at a normal speed or at a faster trick play speed (e.g., 2×, 4×, etc.) as desired.

Additionally, multi-view video streams, such as stereoscopic video streams with interleaved left views and right views, are becoming more common as supporting hardware (e.g., 3D televisions, etc.) become available. However, many devices may not support multi-view video streams. Various embodiments of the present disclosure enable transcoding of a multi-view video stream to exclude views and/or to support trick play modes.

Figure 1:
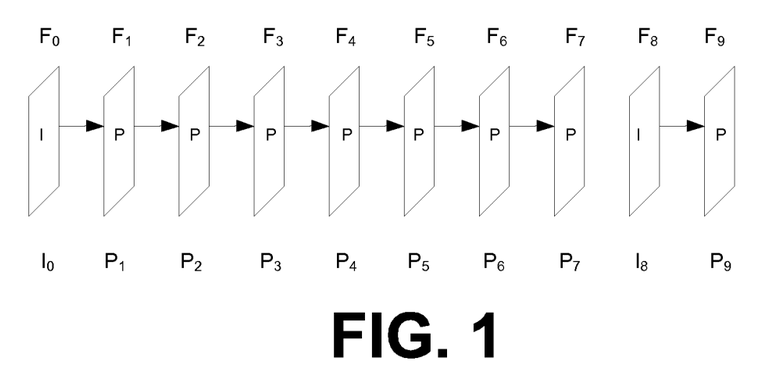
FIG. 1 illustrates an exemplary sequence of frames in a compressed video stream according to an embodiment of the present disclosure.

FIG. 1 illustrates an exemplary sequence of frames in a compressed video stream according to an embodiment of the present disclosure. The sequence of frames in FIG. 1 corresponds to a first group of pictures (GOP) ($F_0$-$F_7$) and at least a portion of a second GOP ($F_8$-$F_9$). Each GOP is defined by the location of an I-frame (e.g., $F_0$ and $F_8$), which are independently decodable because they use only the information present in that frame. P-frames (e.g., $F_1$-$F_7$ and $F_9$) use motion information from previous frames as well as the information present in that frame. Another type of frame is a B-frame, which are bi-directionally predicted frames that use information from previous and subsequent frames. Although not illustrated in FIG. 1 for simplicity, B-frames are typically used and can significantly complicate trick mode creation.

In the compressed state, the video frames appear as a sequence of bits represented in the bitstream $I_0$, $P_1$, $P_2$, $P_3$, $P_4$, $P_5$, $P_6$, $P_7$, $I_8$, $P_9$. When uncompressed, the bitstream $F_0$, $F_1$, $F_2$, $F_3$, $F_4$, $F_5$, $F_6$, $F_7$, $F_8$, $F_9$ is available, which corresponds to normal, forward play. The sequence of frames to implement reverse order play is $F_9$, $F_8$, $F_7$, $F_6$, $F_5$, $F_4$, $F_3$, $F_2$, $F_1$, $F_0$. This could be accomplished by using a large memory to store all of the frames in an uncompressed format from the beginning of the sequence and presenting the frames for display in reverse order. However, this may be impractical due to the memory requirements of high definition video. For example, 373,248,000 bytes may be required to store one second of video at the high definition resolution of 1920×1080 progressive at 60 Hz.

One approach for generating a reverse order video stream may involve decoding individual frames including dependencies. Whenever the trick mode is requested by the user, if the input was a compressed stream that is still present in the system memory, then a stream pointer is positioned to the closest I-frame to the point where the display is desired. In the example of FIG. 1, the frame $F_8$ is decoded and stored in memory, and after that frame $F_9$ is decoded and stored in the memory. After having both of them stored, the frame $F_9$ is displayed, and after that the frame $F_8$ is displayed.

Next, the pointer is positioned in the compressed bitstream to the previous I-frame, which is $I_0$. This allows the decoding of frame $F_0$, which in turn will allow the frame $P_1$ to be decoded and the frame $F_1$ to be generated. Subsequently, the frames $F_1$ and $F_0$ will be displayed. More frames may be decoded and displayed depending on the performance of the decoder. However, the GOP length may sometimes be very large, up to tens or even hundreds of frames, and the corresponding memory requirements may be massive as well. Thus, such an approach may be impractical for accurate reverse trick mode play.

Figure 2:
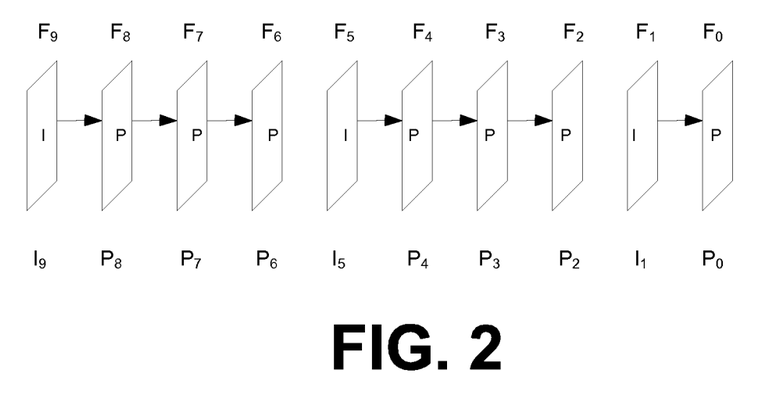
FIG. 2 illustrates an exemplary sequence of frames in an encoded reverse order video stream according to an embodiment of the present disclosure.

FIG. 2 illustrates an exemplary sequence of frames in an encoded reverse order video stream according to an embodiment of the present disclosure. As a non-limiting example, the reverse order video stream has been encoded using a GOP of four frames. In this case, a buffer of four uncompressed frames may be employed. In the compressed state, the video frames appear as a sequence of bits represented in the bitstream $I_9$, $P_8$, $P_7$, $P_6$, $I_5$, $P_4$, $P_3$, $P_2$, $I_1$, $P_0$. When uncompressed, the bitstream $F_9$, $F_8$, $F_7$, $F_6$, $F_5$, $F_4$, $F_3$, $F_2$, $F_1$, $F_0$ is available, which corresponds to reverse play.

To illustrate, assume that the frames $F_2$, $F_3$, $F_4$, and $F_5$ are in the buffer and the four pictures are encoded in reverse order starting with the last picture $F_5$ first, which is coded as an I-frame, followed by $F_4$, $F_3$, and $F_2$ which are predicted from each other and from $F_5$. The compressed version of the four frames in reverse time order $I_5$, $P_4$, $P_3$, and $P_2$ may be efficiently stored in the local memory or sent over a data communications network. When the next frames in forward time order arrive for display ($F_6$, $F_7$, $F_8$, and $F_9$), the same process described above is performed. The first frame to be encoded is $F_9$ as an I-frame, followed by $F_8$, $F_7$, and $F_6$ encoded as P-frames predicted from each other and from the frame $F_9$.

The compressed version of the four frames in reverse time order is I9, P8, P7, and P6. These frames may be prepended or otherwise linked by way of an indirect mapping to the compressed stream already stored in memory, thus generating a concatenated bitstream $I_9$, $P_8$, $P_7$, $P_6$, $I_5$, $P_4$, $P_3$, $P_2$ that is pre-conditioned for accurate reverse play. When reverse play is requested by the user, a normal decoder produces the sequence of frames in reverse time order. In some cases, a trick-mode decoder may decode the encoded reverse order video stream to facilitate trick play at a faster playback speed.

Figure 3:
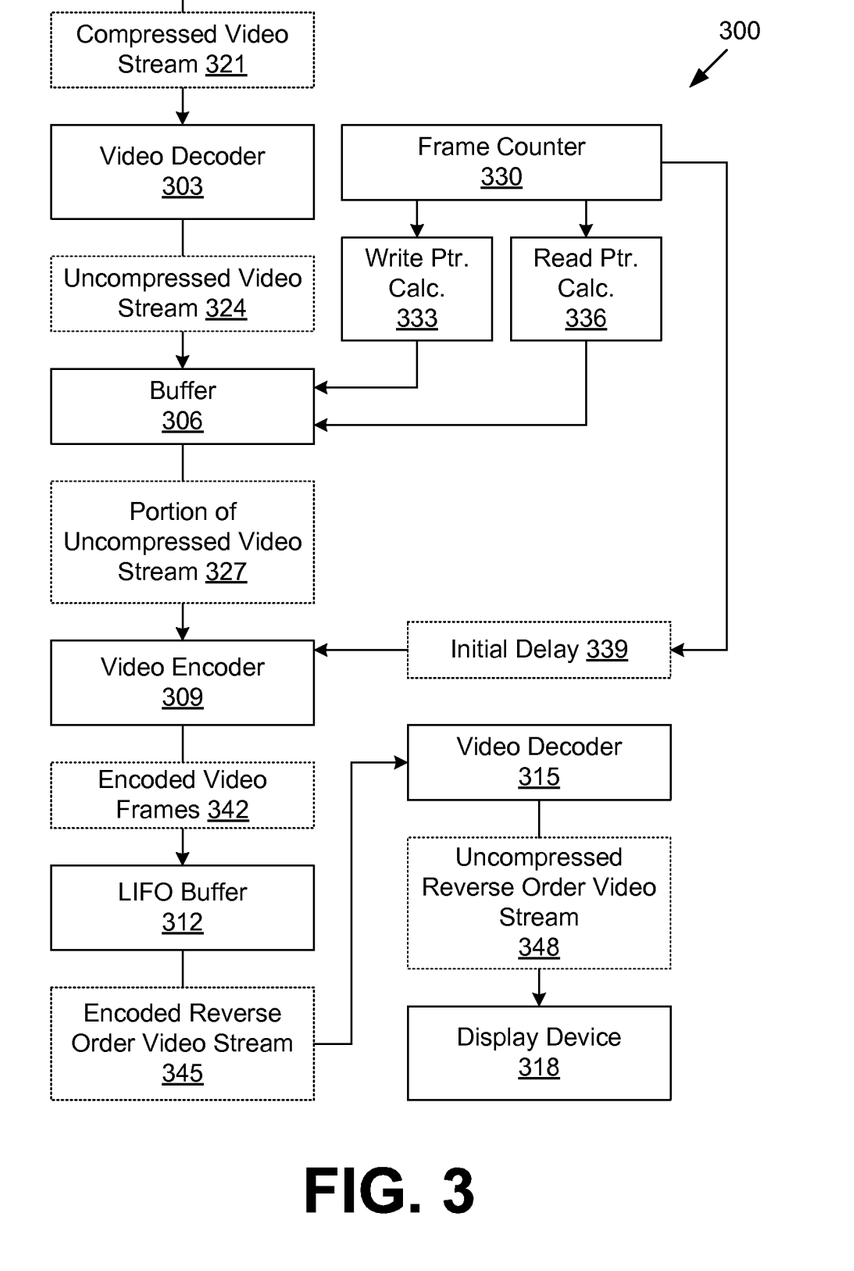
FIG. 3 is a block diagram showing a portion of an exemplary video processing device according to an embodiment of the present disclosure.

FIG. 3 is a block diagram showing a portion of an exemplary video processing device 300 according to an embodiment of the present disclosure. FIG. 3 also illustrates the data flow among various components of the video processing device 300. The video processing device 300 may correspond to a digital video recorder (DVR), a television, a BLU-RAY player, a digital video disc (DVD) player, a cable television receiver, a satellite television receiver, a computing device, a mobile computing device, a smartphone, a tablet computer, or other devices with video processing capabilities. The video processing device 300 may include one or more video decoders 303, a buffer 306, one or more video encoders 309, a last-in-first-out buffer 312, one or more video decoders 315, and/or other components. The video processing device 300 may include, or be coupled to, one or more display devices 318.

The video processing device 300 may obtain a compressed video stream 321 from a source such as a cable decoder, a satellite decoder, a broadcast television decoder, a DVD device, a BLU-RAY device, a data store, and/or another source. The compressed video stream 321 may be encoded using a video codec such as, for example, Moving Pictures Experts Group (MPEG)-2, MPEG-4, Advanced Video Coding (AVC), VC-1, High Efficiency Video Coding (HEVC), VP8, and/or other video codecs. The video decoder 303 decodes and decompresses the compressed video stream 321, thereby generating the uncompressed video stream 324. Although a compressed video stream 321 and video decoder 303 are pictured in FIG. 3, it is understood that an uncompressed video stream may be provided directly to the video processing device 300 in some embodiments.

The uncompressed video stream 324 is stored in a buffer 306, which has a capacity for N uncompressed video frames, where N corresponds to a GOP length to be used by the video encoder 309. It is noted that the GOP length employed by the video encoder 309 may differ from the GOP length employed in the compressed video stream 321. In various embodiments, the buffer 306 may correspond to a fixed buffer or a circular buffer.

The video encoder 309 reads a portion of the uncompressed video stream 327 from the buffer 306, and encodes the portion of the uncompressed video stream 327 in a reverse order. The video encoder 309 may employ a video codec such as, for example, MPEG-2, MPEG-4, AVC, VC-1, HEVC, VP8, and/or other video codecs. It is noted that the video encoder 309 and the video decoder 303 may employ the same video codec or a different video codec. If the video encoder 309 employs the same video codec as the video decoder 303, then the video encoder 309 may encode the video frames from the portion of the uncompressed video stream 327 using the same parameters or different parameters from the encoding of the compressed video stream 321. In one embodiment, the video encoder 309 may be idle, while the buffer 306 is being filled.

In contrast to the pre-encoded compressed video stream 321, the video encoder 309 may employ an encoding configuration that is specially chosen for the characteristics of the video processing device 300 and/or the display device 318. As a non-limiting example, the display device 318 may correspond to a smartphone or other device with limited display resolution capabilities. The video encoder 309 may employ a more aggressive compression, downscaling, frame rate downconversion, etc. given the limited display resolution capabilities of the display device 318.

In one embodiment, a frame counter 330 may be employed to manage the reading from and writing to the buffer 306. A write pointer calculator 333 may indicate the address at which an incoming video frame is to be written in the buffer 306, and a read pointer calculator 336 may indicate the address at which the outgoing video frame is to be read. The write pointer and read pointer may progress in tandem to implement a time inversion for reverse play.

In one non-limiting example of accessing the buffer 306, the write pointer will be generated sequentially as 0, 1, 2 . . . N−2, N−1, for the first chunk of N frames (chunk 0) and for every even chunk. After an initial delay 339 of N frames, the read pointer will take the values N−1, N−2 . . . 2, 1, 0 to select a frame to be encoded by the video encoder 309. For the second chunk of N frames (chunk 1) and for every odd chunk, the write pointer will sequentially take the values N−1, N−2 . . . 2, 1, 0, while the read pointer will sequentially take the values 0, 1, 2 . . . N−2, N−1.

The encoded video frames 342 are written by the video encoder 309 into the LIFO buffer 312. The LIFO buffer 312 is flushed after the entire chunk of N frames has been encoded, thereby producing an encoded reverse order video stream 345. The contents of the LIFO buffer 312 may be prepended to the previous output or otherwise linked to the previous output in the correct reverse order through an indirect mapping, a linked list, etc. The encoded reverse order video stream 345 may be stored in a data store such as, for example, a hard disk, solid-state drive, random access memory (RAM), cloud data storage, and/or any other form of volatile or non-volatile memory. The data store may correspond to local data storage within the video processing device 300 or remote data storage accessible by a network. Such a network may include, for example, the Internet, intranets, extranets, wide area networks (WANs), local area networks (LANs), wired networks, wireless networks, or other suitable networks, etc., or any combination of two or more such networks.

When reverse trick play is activated by a user, a video decoder 315 reads the encoded reverse order video stream 345, decodes the sequence of video frames, and outputs an uncompressed reverse order video stream 348. The video decoder 315 may decode the encoded reverse order video stream 345 at a normal speed or at a faster trick play speed (e.g., 2×, 4×, etc.) as configured by the user. The uncompressed reverse order video stream 348 may then be output to the display device 318. The display device 318 may comprise, for example, one or more devices such as cathode ray tubes (CRTs), liquid crystal display (LCD) screens, gas plasma-based flat panel displays, LCD projectors, or other types of display devices, etc.

In various embodiments, the video processing device 300 may be configured to associate markers with specific frames in the video streams. For example, a user may associate a marker with a frame in the uncompressed video stream 324. Such a marker may persist through the encoding of the reverse order video stream 345 such that the marker remains associated with the video frame. The markers may be employed for users to seek to specific portions of the video streams.

Figure 4:
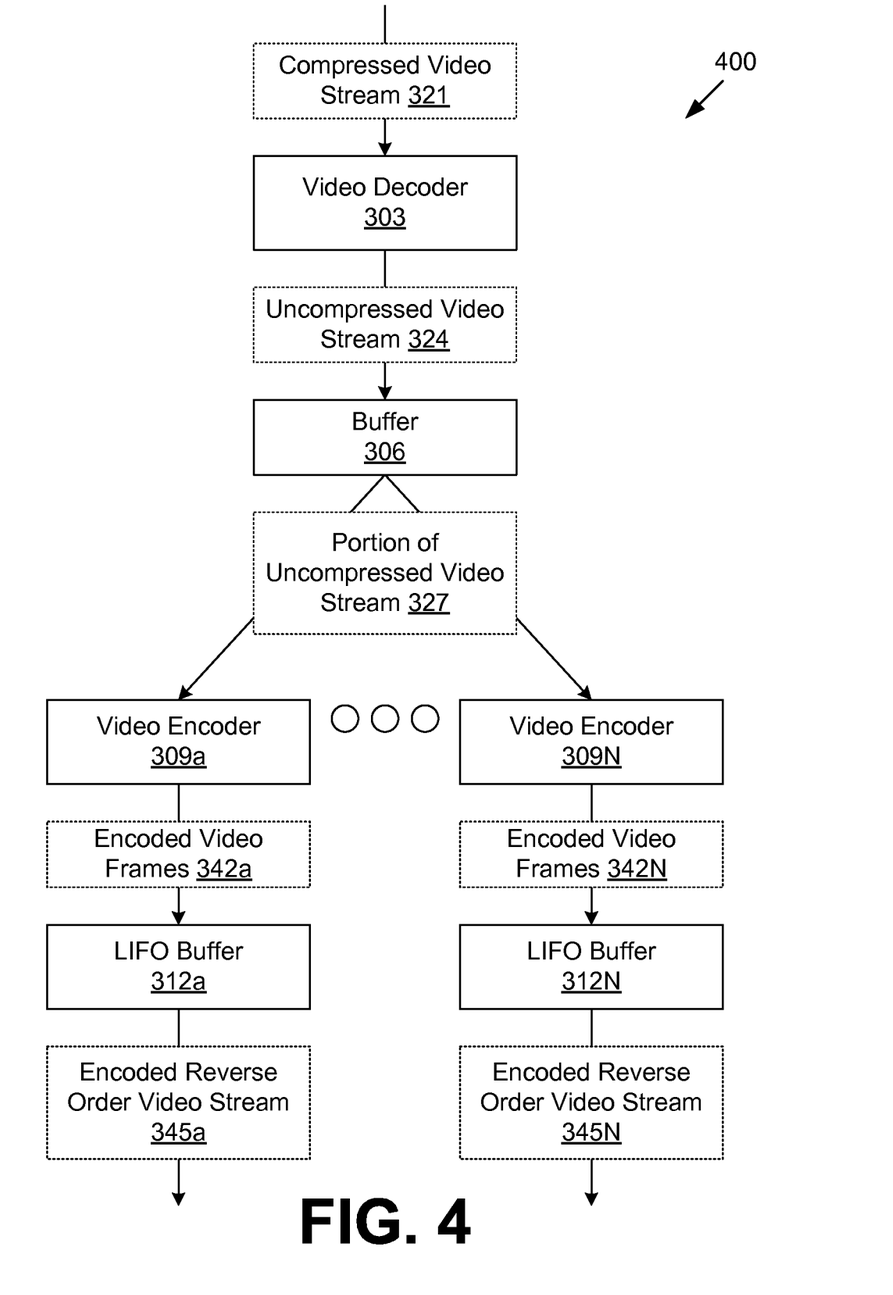
FIG. 4 is a block diagram showing a portion of an exemplary video processing device that generates multiple encoded reverse order video streams according to another embodiment of the present disclosure.

FIG. 4 is a block diagram showing a portion of an exemplary video processing device 400 that generates multiple encoded reverse order video streams 345 according to another embodiment of the present disclosure. In contrast to FIG. 3, the video processing device 400 include a plurality of video encoders 309a . . . 309N, which together generate a plurality of encoded video frames 342a . . . 342N as output to respective LIFO buffers 312a . . . 312N. The respective LIFO buffers 312 are flushed to generate a plurality of encoded reverse order video streams 345a . . . 345N. Multiple encoded reverse order video streams 345 may be desired so that streams are specially encoded for the characteristics of multiple different display devices 318 (FIG. 3). Alternatively, multiple encoded reverse order video streams 345 may encode multiple trick play speeds (e.g., one encodes the stream at 1×, while another encodes the stream at 2×, and so on).

Figure 5:
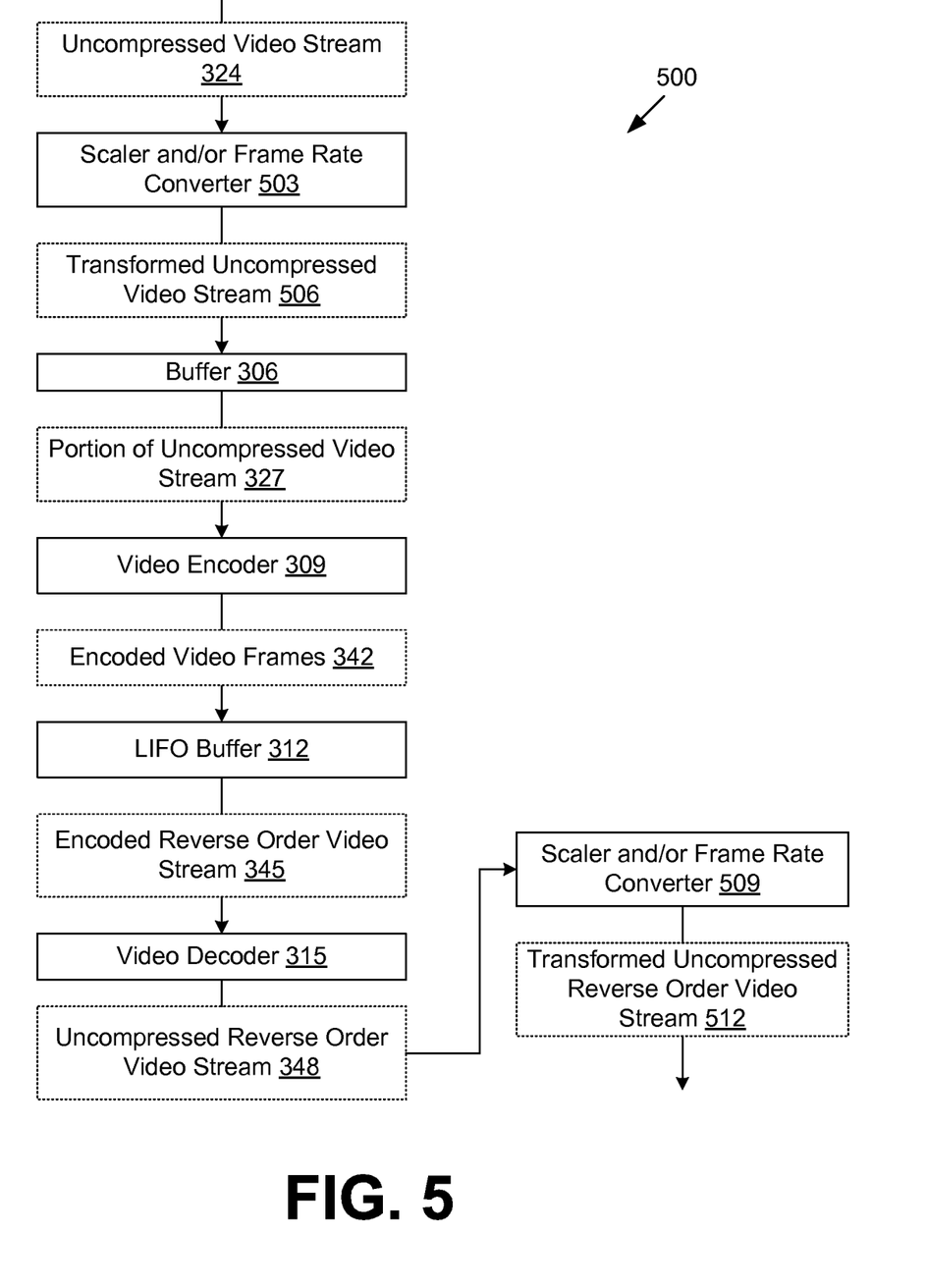
FIG. 5 is a block diagram showing a portion of an exemplary video processing device that performs scaling and/or frame rate conversion according to another embodiment of the present disclosure.

FIG. 5 is a block diagram showing a portion of an exemplary video processing device 500 that performs scaling and/or frame rate conversion according to another embodiment of the present disclosure. In FIG. 5, the uncompressed video stream 324 is processed by a scaler and/or frame rate converter 503. The scaler and/or frame rate converter 503 may scale the resolution and/or modify the frame rate of the uncompressed video stream 324. The scaler and/or frame rate converter 503 may apply other transformations in other embodiments. In one example, the scaler and/or frame rate converter 503 downscales the video in order to save memory and/or reduce processing requirements for the reverse trick mode stream. The scaler and/or frame rate converter 503 generates a transformed uncompressed video stream 506, which is provided to the buffer 306.

In addition, the output of the video decoder 315, the uncompressed reverse order video stream 348 may undergo a transformation by the scaler and/or frame rate converter 509, which may scale the resolution, modify the frame rate, and/or apply another transformation. In one example, the scaler and/or frame rate converter 509 may upscale the video for display, where the video had been downscaled in order to save memory. The scaler and/or frame rate converter 509 generates a transformed uncompressed reverse order video stream 512.

Figure 6:
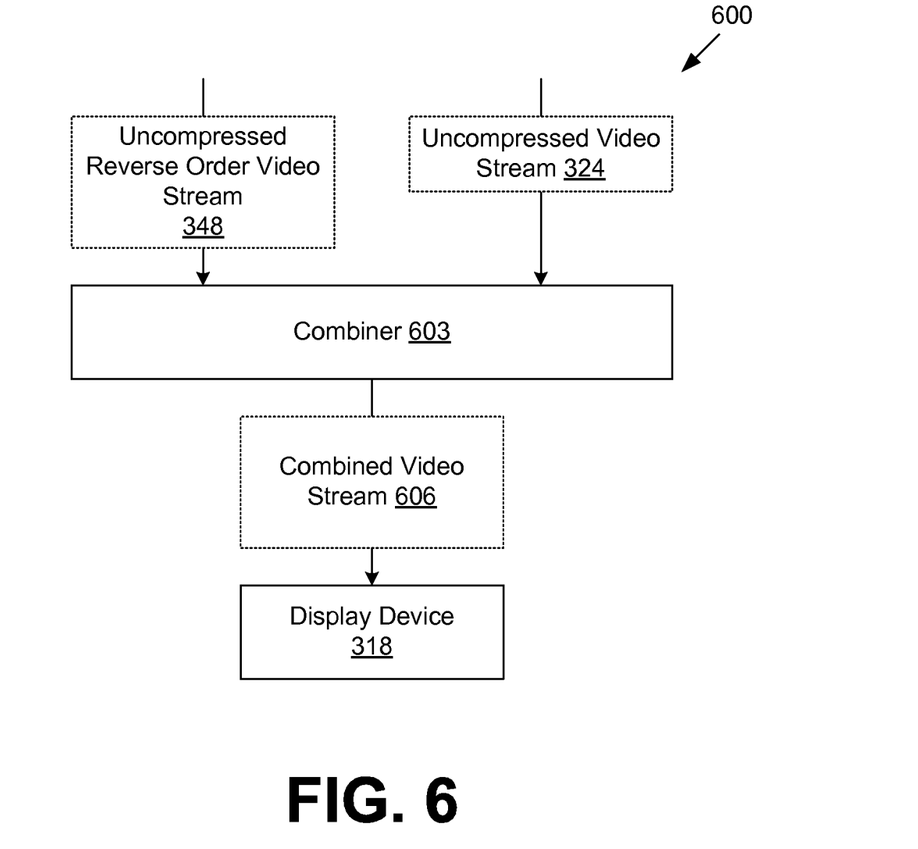
FIG. 6 is a block diagram showing a portion of an exemplary video processing device that combines a reverse order stream with a forward order stream according to another embodiment of the present disclosure.

FIG. 6 is a block diagram showing a portion of an exemplary video processing device 600 that combines a reverse order stream with a forward order stream according to another embodiment of the present disclosure. The uncompressed reverse order video stream 348 and the uncompressed video stream 324 are presented to a combiner 603, which generates a combined video stream 606 or video signal that is output to a display device 318 or stored for future use. For example, the combined video stream 606 may have half of the screen displaying a reverse stream and the other half of the screen displaying a forward stream. Consequently, the user may "rewind" a program and continue to watch it as it proceeds at the same time.

Figure 7:
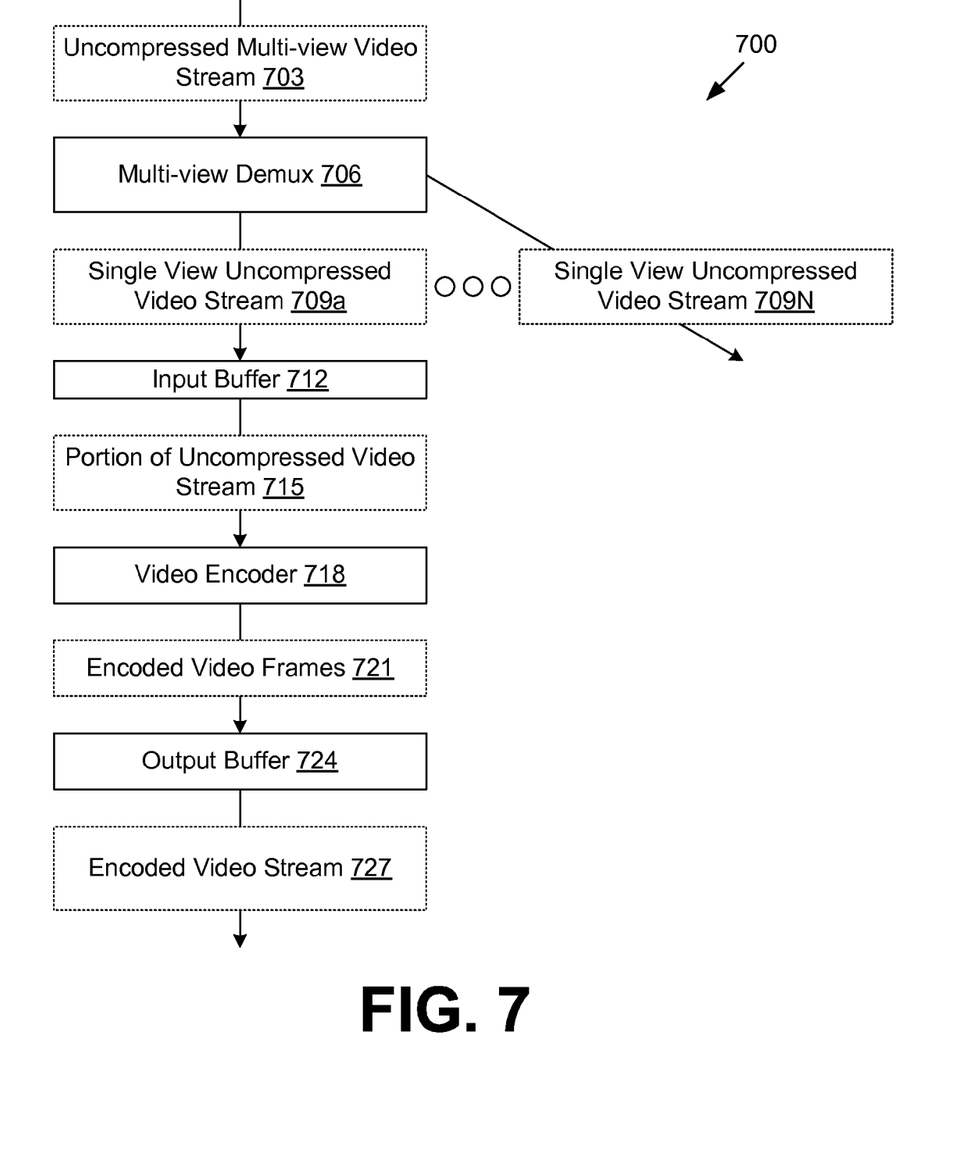
FIG. 7 is a block diagram showing a portion of an exemplary video processing device that processes a multi-view video stream according to another embodiment of the present disclosure.

FIG. 7 is a block diagram showing a portion of an exemplary video processing device 700 that processes a multi-view video stream according to another embodiment of the present disclosure. The video processing device 700 obtains an uncompressed multi-view video stream 703, which may correspond to a stereoscopic, three-dimensional, or other multi-view stream. The multi-view video stream 703 is processed by a multi-view demultiplexer 706, which generates potentially multiple single-view uncompressed video streams 709a . . . 709N. The single-view uncompressed video streams 709 may correspond to a left-eye view, a right-eye view, and/or other views. In some embodiments, multi-view video streams may be generated with a proper subset of the original set of multiple views.

A single-view uncompressed video stream 709a is passed to an input buffer 712, which may, for example, correspond to the buffer 306 (FIG. 3). A video encoder 718, which may correspond to the video encoder 309, reads a portion of the uncompressed video stream 715 from the input buffer 712. The video encoder 718 encodes the video using a video codec, thereby generating encoded video frames 721, which are passed to an output buffer 724. The output buffer 724 may, for example, correspond to the LIFO buffer 312 (FIG. 3). The encoded video stream 727 is then flushed from the output buffer 724 and stored in a data store or presented to a video decoder 315 (FIG. 3) for decoding.

The video processing device 700 may be configured to output a left-eye view, a right-eye view, and/or both as separated encoded video streams. Display devices 318 which lack support for a multi-view format may then display the decoded output of any one of the separated encoded video streams. One or more of the separated encoded video streams may be encoded in a forward direction and/or a reverse direction according to the principles of the present disclosure. Where multiple encoded video streams are generated, the streams may exclude a different respective subset of the views.

Figure 8:
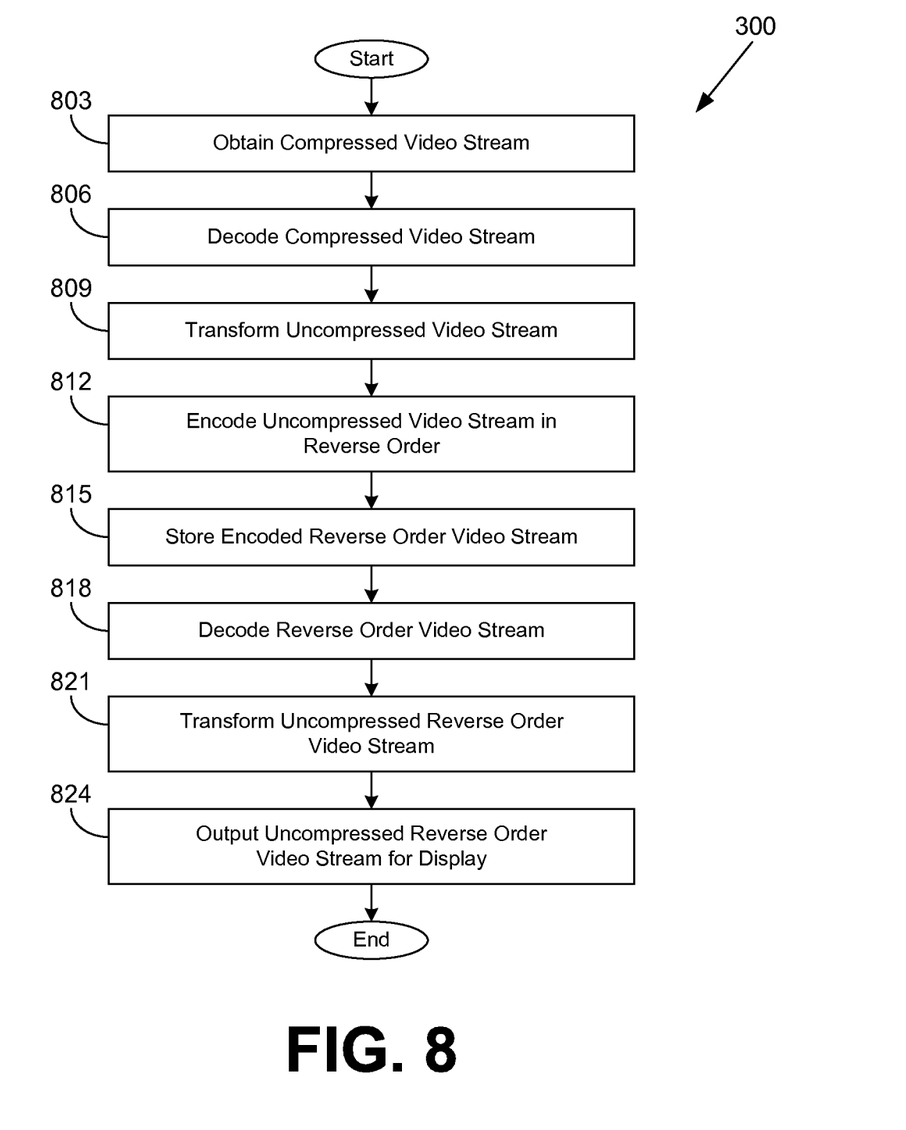
FIG. 8 is a flowchart that provides one example of the operation of portions of the exemplary video processing device of FIG. 3 according to various embodiments.

FIG. 8 is a flowchart that provides one example of the operation of a portion of the video processing device 300 (FIG. 3) according to various embodiments. It is understood that the flowchart of FIG. 8 provides merely an example of the many different types of functional arrangements that may be employed to implement the operation of the portion of the video processing device 300 as described herein. As an alternative, the flowchart of FIG. 8 may be viewed as depicting an example of steps of a method implemented in the video processing device 300 according to one or more embodiments.

Beginning with box 803, the video processing device 300 obtains a compressed video stream. In box 806, the video processing device 300 decodes the compressed video stream to generate an uncompressed video stream. In box 809, the video processing device 300 may transform the uncompressed video stream, e.g., by scaling, converting the frame rate, etc. In box 812, the video processing device 300 encodes the uncompressed video stream in reverse order.

In box 815, the video processing device 300 may store the encoded reverse order video stream. In box 818, the video processing device 300 decodes the reverse order video stream. In box 821, the video processing device 300 may transform the uncompressed reverse order video stream, e.g., by scaling, converting the frame rate, etc. In box 824, the video processing device 300 outputs the uncompressed reverse order video stream for display. Thereafter, the portion of the video processing device 300 ends.

Figure 9:
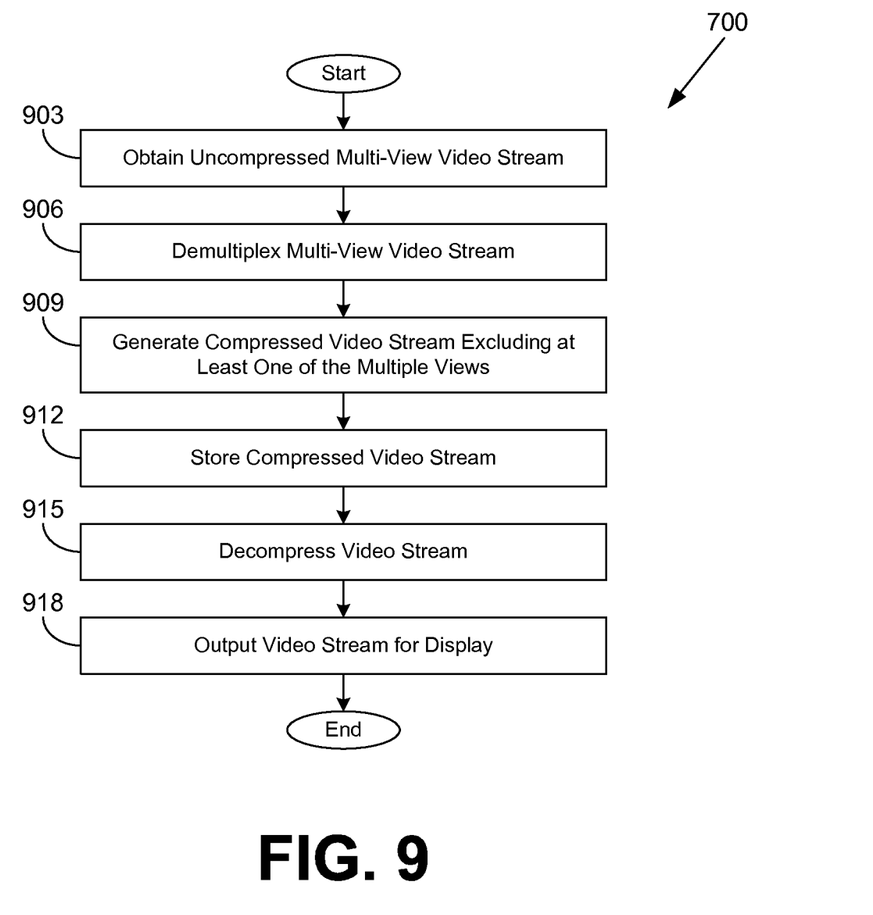
FIG. 9 is a flowchart that provides one example of the operation of portions of the exemplary video processing device of FIG. 7 according to various embodiments.

FIG. 9 is a flowchart that provides one example of the operation of a portion of the video processing device 700 (FIG. 7) according to various embodiments. It is understood that the flowchart of FIG. 9 provides merely an example of the many different types of functional arrangements that may be employed to implement the operation of the portion of the video processing device 700 as described herein. As an alternative, the flowchart of FIG. 9 may be viewed as depicting an example of steps of a method implemented in the video processing device 700 according to one or more embodiments.

Beginning with box 903, the video processing device 700 obtains an uncompressed multi-view video stream. In box 906, the video processing device 700 demultiplexes the multi-view video stream to produce one or more video streams with a reduced number of views. In box 909, the video processing device 700 generates a compressed video stream from a demultiplexed video stream, where the compressed video stream excludes one or more of the multiple views.

In box 912, the video processing device 700 stores the compressed video stream. In box 915, the video processing device 700 decompresses the video stream. In box 918, the video processing device 700 outputs the video stream for display. Thereafter, the portion of the video processing device 700 ends.

Figure 10:
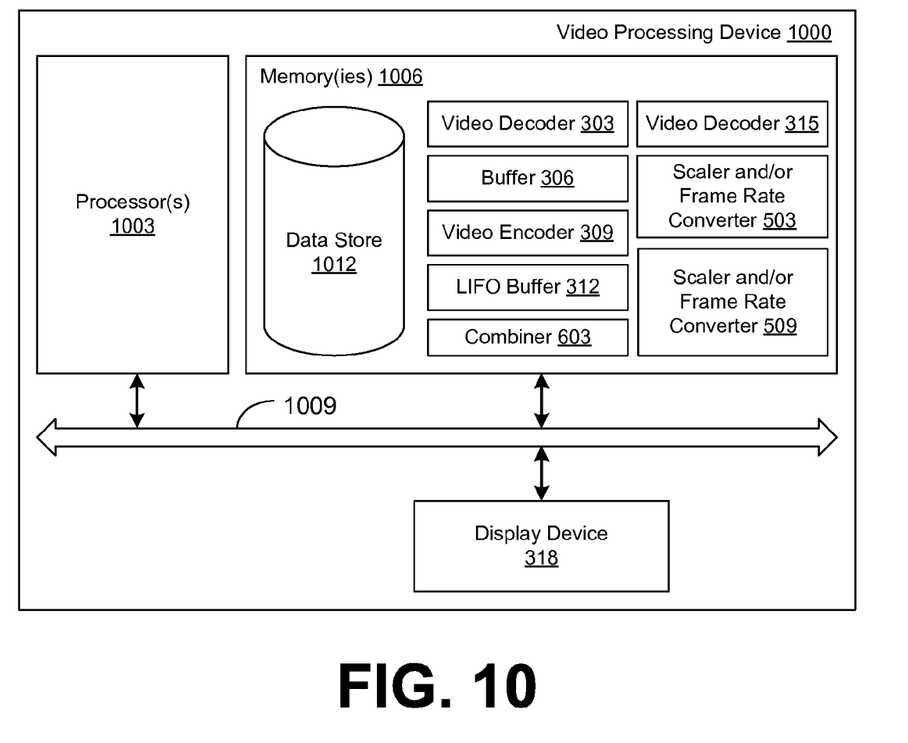
FIG. 10 is a schematic block diagram that provides one example illustration of an exemplary video processing device according to various embodiments of the present disclosure.

With reference to FIG. 10, shown is a schematic block diagram of a video processing device 1000 according to various embodiments of the present disclosure. The video processing device 1000 includes at least one processor circuit, for example, having a processor 1003 and a memory 1006, both of which are coupled to a local interface 1009. To this end, the video processing device 1000 may comprise, for example, at least one computing device or like device. The local interface 1009 may comprise, for example, a data bus with an accompanying address/control bus or other bus structure as can be appreciated. The local interface 1009 may be coupled to one or more display devices 318.

Stored in the memory 1006 are both data and several components that are executable by the processor 1003. In particular, stored in the memory 1006 and executable by the processor 1003 are video decoders 303 and 315, video encoder 309, combiner 603, scaler and/or frame rate converters 503 and 509, and potentially other systems. Also stored in the memory 1006 may be a data store 1012, buffer 306, LIFO buffer 312, and other data. In addition, an operating system may be stored in the memory 1006 and executable by the processor 1003.

It is understood that there may be other systems that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, assembly, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction. In one embodiment, the processor 1003 and memory 1006 may correspond to a system-on-a-chip.

Although video decoders 303 and 315, video encoder 309, combiner 603, scaler and/or frame rate converters 503 and 509, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8 and 9 show the functionality and operation of an implementation of portions of the video processing devices 300 and/or 700. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including video decoders 303 and 315, video encoder 309, combiner 603, and scaler and/or frame rate converters 503 and 509, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
a video processing device including at least one circuit, the video processing device being configured to:

obtain an uncompressed video stream comprising a sequence of video frames including both a left-eye view and a right-eye view from a compressed video stream;
generate an encoded reverse order video stream including one of the left-eye view or the right-eye view and excluding the other of the left-eye view or the right-eye view, the encoded reverse order video stream generated from the uncompressed video stream by:
storing a portion of the sequence of video frames in a buffer;
encoding the portion of the sequence of video frames in a reverse order using video encoder logic; and
outputting the encoded portion of the sequence of video frames in the reverse order; and
generate a video signal that concurrently renders the sequence of video frames in a forward order and the sequence of video frames in the reverse order;
wherein the compressed video stream is compressed using a first group-of-pictures (GOP) length, and the encoded reverse order video stream is compressed using a second GOP length.

2. The system of claim 1, wherein the video encoder logic is configured to encode the portion of the sequence of video frames in response to the entire portion of the sequence of video frames being stored in the buffer.

3. The system of claim 1, wherein the video processing device is further configured to generate a video signal by decoding the encoded reverse order video stream using video decoder logic, and the video encoder logic and the video decoder logic employ a same video codec.

4. The system of claim 3, wherein the video decoder logic is configured to decode the encoded reverse order video stream at a trick play speed.

5. The system of claim 1, wherein the video processing device is further configured to:
output the uncompressed video stream to a first display device; and
output the encoded reverse order video stream to a second display device; and
wherein the video processing device is configured to output the uncompressed video stream and the encoded reverse order video stream concurrently.

6. The system of claim 1, wherein the video processing device is further configured to generate a video signal that concurrently renders the sequence of video frames in a forward order and the sequence of video frames in the reverse order.

7. A method implemented in a video processing device, comprising:
decoding, in at least one circuit, a compressed video stream to obtain a uncompressed video stream comprising a sequence of video frames including both a left-eye view and a right-eye view;
generating, in the at least one circuit, an encoded reverse order video stream including one of the left-eye view or the right-eye view and excluding the other of the left-eye view or the right-eye view, the encoded reverse order video stream generated from the uncompressed video stream by:
storing a portion of the sequence of video frames in a buffer;
encoding the portion of the sequence of video frames in a reverse order; and
outputting the encoded portion of the sequence of video frames in the reverse order; and
generating a video signal that concurrently renders the sequence of video frames in a forward order and the sequence of video frames in the reverse order;
wherein the compressed video stream is compressed using a first group-of-pictures (GOP) length, and the encoded reverse order video stream is compressed using a second GOP length.

8. The method of claim 7, wherein the outputting further comprises linking the encoded portion of the sequence of video frames in the reverse order with an adjacent encoded portion of the sequence of video frames in the reverse order.

9. The method of claim 7, wherein the encoding further comprises storing an encoded video frame of the sequence of video frames in a last-in-first-out (LIFO) buffer, and the outputting further comprises transferring the encoded portion of the sequence of video frames from the LIFO buffer.

10. The method of claim 7, wherein the storing further comprises storing the portion of the sequence of video frames in the buffer in the reverse order.

11. The method of claim 7, wherein the encoding employs a video codec selected from the group consisting of: Moving Pictures Experts Group (MPEG)-2, MPEG-4, Advanced Video Coding (AVC), VC-1, High Efficiency Video Coding (HEVC), and VP8.

12. The method of claim 7, further comprising:
applying a first transformation to the uncompressed video stream;
applying a second transformation to the encoded reverse order video stream; and
wherein the first and second transformations each modify at least one video parameter selected from the group consisting of: a frame rate and a frame scale.

13. A system, comprising:
a video processing device including at least one circuit, the video processing device being configured to:
obtain an uncompressed video stream including both a left-eye view and a right-eye view from a compressed video stream;
generate an encoded reverse order video stream from the uncompressed video stream, wherein the compressed video stream includes one of the left-eye view or the right-eye view and excludes the other of the left-eye view or the right-eye view; and
generate a video signal that concurrently renders the sequence of video frames in a forward order and the sequence of video frames in the reverse order;
wherein the compressed video stream is compressed using a first group-of-pictures (GOP) length, and the encoded reverse order video stream is compressed using a second GOP length.

14. The system of claim 13, wherein the uncompressed video stream includes a sequence of video frames in a forward order, and the generating comprises:
storing a portion of the sequence of video frames in a buffer;
encoding the portion of the sequence of video frames in a reverse order using video encoder logic; and
outputting the encoded portion of the sequence of video frames in the reverse order.

15. The system of claim 13, wherein the video processing device is further configured to generate another compressed video stream from the uncompressed video stream, wherein the other compressed video stream excludes a different at least one of the views.

16. The system of claim 14, wherein the video processing device is further configured to associate a marker with a particular video frame of the sequence of video frames in the uncompressed video stream, wherein the marker remains associated with the particular video frame in the encoded portion of the sequence of video frames that is output in the reverse order.

* * * * *